United States Patent
Yang et al.

(10) Patent No.: US 9,322,118 B2
(45) Date of Patent: Apr. 26, 2016

(54) WEAR-RESISTANT CLAMPING PLATE DEVICE FOR STUFFER BOX CRIMPER

(75) Inventors: Baoru Yang, Jiangsu (CN); Jianhua Cao, Jiangsu (CN)

(73) Assignee: NANTONG CELLULOSE FIBERS CO., LTD., Jiangsu (CN)

( * ) Notice: Subject to any disclaimer, the term of this patent is extended or adjusted under 35 U.S.C. 154(b) by 257 days.

(21) Appl. No.: 14/126,162

(22) PCT Filed: Jun. 15, 2012

(86) PCT No.: PCT/CN2012/077020
§ 371 (c)(1),
(2), (4) Date: Dec. 13, 2013

(87) PCT Pub. No.: WO2012/171489
PCT Pub. Date: Dec. 20, 2012

(65) Prior Publication Data
US 2014/0150226 A1    Jun. 5, 2014

(30) Foreign Application Priority Data
Jun. 16, 2011 (CN) .......................... 2011 1 0162858

(51) Int. Cl.
*D02G 1/12* (2006.01)
*F16B 2/14* (2006.01)

(52) U.S. Cl.
CPC .... *D02G 1/12* (2013.01); *F16B 2/14* (2013.01)

(58) Field of Classification Search
CPC ........... D02G 1/12; D02G 1/125; D02G 1/14; D02G 1/122; D02J 1/04; F16B 2/14
USPC ....................... 28/263, 268, 269, 270; 26/18.6
See application file for complete search history.

(56) References Cited

U.S. PATENT DOCUMENTS 3,160,941 A * 12/1964 Williamson ............. D02G 1/12
                                                       19/66 R
3,373,469 A *  3/1968 Boggs ...................... D02G 1/12
                                                       28/269
(Continued)

FOREIGN PATENT DOCUMENTS

CN         2608559 Y      3/2004
CN         2663459 Y     12/2004
(Continued)

OTHER PUBLICATIONS

International Search Report mailed Sep. 21, 2012; PCT/CN2012/077020.

*Primary Examiner* — Amy Vanatta
(74) *Attorney, Agent, or Firm* — Ladas & Parry LLP

(57) ABSTRACT

A cheek plate device is provided for a stuffer box crimper, which has brackets, adjusting mechanisms, cheek plates, a base frame and a pair of nip rollers. The adjusting mechanisms are mounted on the brackets, which can slide relative to the bracket. The cheek plates are mounted on the inside of the adjusting mechanisms. Two identical brackets, adjusting mechanisms and cheek plates are mounted symmetrically at two sides of the pair of nip rollers and affixed on the base frame. The cheek plate device further comprises fluid thrust devices, which include fluid inlets and cylinders located on the brackets. One end of the adjusting mechanism is inserted into and coupled with the cylinder. The fluid of the thrust device flows into the cylinders through the inlets and pushes, via the adjusting mechanisms, the cheek plates toward the sides of the nip rollers. The thrust device can work hydraulically or pneumatically.

10 Claims, 2 Drawing Sheets

(56) References Cited

U.S. PATENT DOCUMENTS

| | | | | |
|---|---|---|---|---|
| 3,618,183 A | * | 11/1971 | Funk | D02G 1/12 28/269 |
| 3,800,373 A | * | 4/1974 | Fleissner | D02G 1/12 28/248 |
| 3,924,911 A | * | 12/1975 | Bumberger | D02G 1/12 100/176 |
| 4,019,788 A | * | 4/1977 | Buchalla | F16J 15/168 384/483 |
| 4,662,042 A | * | 5/1987 | Bayliss, Sr. | D02G 1/12 28/269 |
| 4,807,337 A | * | 2/1989 | Fleissner | D02G 1/125 28/248 |
| 5,778,502 A | * | 7/1998 | Voigtlander | D02G 1/12 28/263 |
| 7,278,191 B1 | * | 10/2007 | Lane | D02G 1/12 28/263 |

FOREIGN PATENT DOCUMENTS

| | | |
|---|---|---|
| CN | 101367171 A | 2/2009 |
| GB | 1 273 761 | 5/1972 |

* cited by examiner

WEAR-RESISTANT CLAMPING PLATE DEVICE FOR STUFFER BOX CRIMPER

TECHNICAL FIELD

The present invention relates generally to the field of crimpers, and especially, it relates to a type of cheek plate adjusting device.

BACKGROUND

One known cheek plate adjusting device for a stuffer box crimper is fixed by screw 17 on base frame 14. It is widely practiced that two cheek plates 13 are installed on two sides of a pair of nip rollers 15 and a preset clamping force is maintained between cheek plates 13 and the sides of the pair of nip rollers 15. The clamping force is adjusted to such a preset value that it prevents materials from being squeezed out of the edges of the pair of nip rollers while minimizing the friction force between the cheek plates 13 and the pair of nip rollers 15. The clamping force value is adjusted by turning or adjusting screws 16 in or out to move wedge blocks 12 relative to brackets 11, which pushes the cheek plate 13 against the sides of the pair of nip rollers 15. However, it is difficult to adjust the clamping force precisely to the preset value. During operation of the crimper, grinding friction between the surfaces of the static cheek plates and the sides of the fast rotating nip rollers will lead to mechanical wear of the surfaces of the cheek plate, or the sides of the nip rollers, or both, which, after a long period operation, can produce gaps between the cheek plates 13 and the sides of the nip rollers 15. The materials may be squeezed into the gaps, causing damage to the materials and thus affecting product quality. This mechanical wear is a continuous process and the gap becomes bigger gradually, which makes it necessary to make periodic manual adjustment because the current device lacks automatic adjustment mechanism. One patent, No. ZL200320110083.7, related to the present field of invention, disclosed a design that changed the shape of the surface of the wedge that is in contact with the bracket from flat to cylindrical, which solved the problem of parallel adjustment between the cheek plates 13 and the side surfaces of the pair of nip rollers 15 and enables more complete contact between the cheek plates 13 and the side surfaces of the pair of nip rollers 15. This patent disclosed using screws to adjust the clamping force between the cheek plate 13 and the side of pair of nip rollers 15.

DESCRIPTION OF THE INVENTION

The present invention provides a cheek plate device for a stuffer box crimper, which not only can be used conveniently to adjust and set a clamping force precisely between cheek plates and sides of pair of nip rollers, but also automatically compensate any mechanical wear between the cheek plates and the sides of pair of nip rollers to maintain the clamping force.

In one embodiment of the invention, the cheek plate device comprises brackets, adjusting mechanisms, wear-resistant cheek plates, a base frame and a pair of nip rollers. The adjusting mechanisms are mounted on the brackets, which can slide relative to the bracket, the cheek plates are mounted on the inside of the adjusting mechanisms, and two essentially identical brackets, adjusting mechanisms and cheek plates are mounted symmetrically at two sides of the pair of nip rollers and affixed on the base frame. The cheek plate device is characterized by comprising fluid thrust devices, which include cylinders and fluid inlets located on the brackets with one end of the adjusting mechanism being inserted into and coupling with the cylinder. The fluid thrust devices are connected to the fluid inlets and a fluid flows into the cylinders through the inlets and pushes the adjusting mechanisms to move and press against the cheek plates.

The fluid thrust device further includes a tubing system, a pressure gauge, and a pressure reducing valve. The tubing is connected with the inlet on the bracket and the pressure gauge and pressure reducing valve are installed in the tubing system. Each cylinder may have a pressure gauge and a pressure reducing valve. Preferably, the two symmetrically installed cylinders share the same pressure gauge and pressure reducing valve, which are preferably located on a tube that connects to both cylinders and delivers the fluids with equal pressure to both cylinders. The fluid in the fluid thrust device may be liquid or gas.

The adjusting mechanism comprises an adjusting block with a step portion and a stop device. One end of the step portion is a piston that is smaller in diameter than the other end of the step portion and the other end is a wedge, of which, one side is in contact with the cheek plate and the other side in contact with the bracket. The piston is inserted into the cylinder and can slide back and forth along the axis of the cylinder. The stop device is located in the bracket corresponding to the position of the step portion of the adjusting block. The fluid of the thrust device flows into the cylinder through the inlet to drive the piston, the piston pushes the wedge, and the wedge pushes the cheek plate to move towards the sides of the nip rollers.

The piston and the wedge of the adjusting block are fabricated as one piece or as separate pieces that are assembled together to form the adjusting block. The surface of the wedge consists of plural of surfaces, which can be curved, flat or a combination thereof.

The cross section of piston of the adjusting block is a regular geometric shape, and preferably it is a circle.

In another embodiment, the adjusting mechanism comprises an adjusting block, a compression spring and a second piston. The adjusting block has a step portion and a stop device. One end of the step portion is a first piston that is smaller in diameter than the other end of the step portion and the other end is a wedge. The piston is inserted into the cylinder and can slide back and forth along the axis of the cylinder. One side of the wedge is in contact with the cheek plate and the other side with the bracket. The stop device is placed in the bracket corresponding to the position of the step portion of the adjusting block. The first piston is in contact with one end of the compression spring in the cylinder, the other end of the compression spring is in contact with one end of the second piston, and the other end of the second piston is in contact with the inlet end of the bracket. The fluid from the thrust device flows into the cylinder through the inlet to drive the second piston, which presses the compression spring, which, via the first piston, moves the wedge, which pushes the cheek plate to move towards the sides of the nip rollers.

The first piston and the wedge of the adjusting block can be fabricated as one piece or as separate pieces that are assembled together to form the adjusting block.

The surface of the wedge consists of a plural of surfaces, which can be curved, flat or a combination thereof, preferably, a plural of flat surfaces, and more preferably, a combination of flat and curved surfaces.

The cross section of the first piston of the adjusting block is a regular geometric shape, and preferably, a circle.

The cylinder is vented to the atmosphere at a location where the compression spring is housed.

According to the above embodiments, the present invention includes following characteristics: a piston mechanism replaces the screw adjusting device of the known art. This mechanism not only can be used conveniently to adjust and set a clamping force precisely between the cheek plates and sides of the pair of nip rollers, but also automatically compensate any mechanical wear between the cheek plates and the sides of pair of nip rollers to maintain the clamping force. Furthermore, parts of the invention are easier to be fabricated and installed.

EXAMPLES

The present invention is further described by following examples illustrated with drawings.

Example 1

Figure 1:
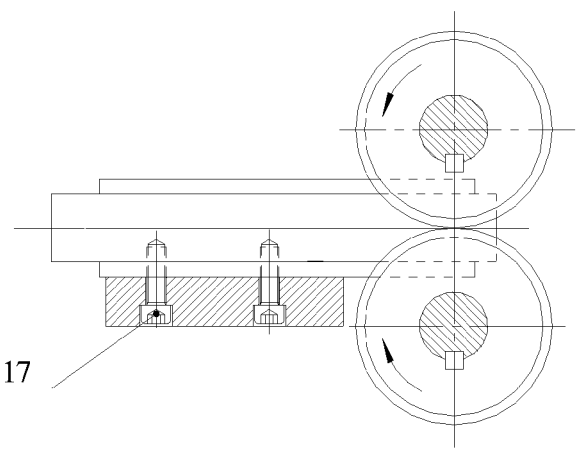
FIG. 1 Front view of the known cheek plate adjusting device
FIG. 2 Top view of the known cheek plate adjusting device
FIG. 3 Detailed view of the screw adjusting construction of the known cheek plate adjusting device
FIG. 4 Top view of the example 1 of the invention
FIG. 5 Top view of the example 2 of the invention
Figure 2:
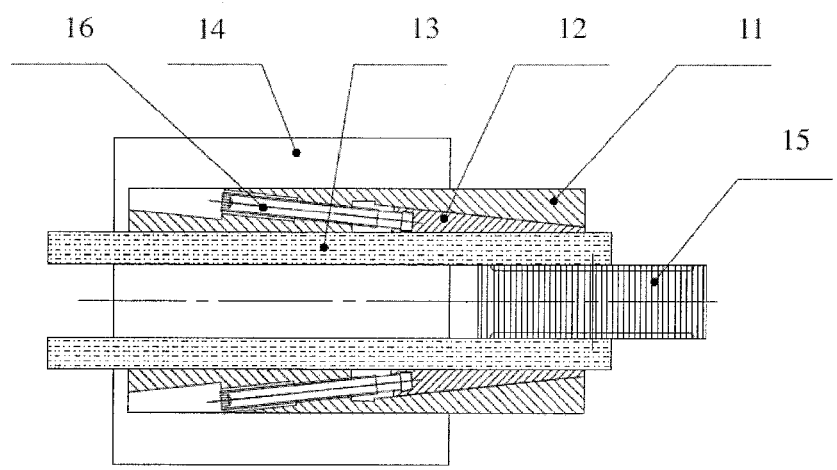
Figure 3:
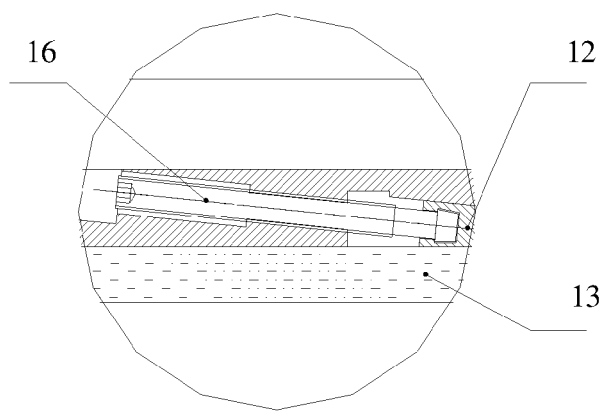
Figure 4:
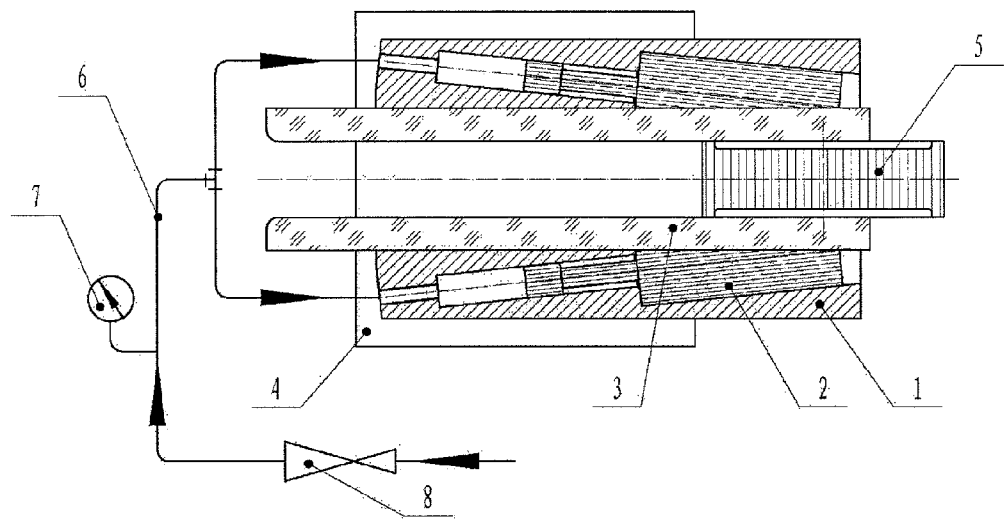

As illustrated in FIG. 4, a cheek plate adjusting device for a crimper includes bracket 1, adjusting block 2, which is installed on bracket 1 and can slide relative to the bracket, and the cheek plate 3 installed inside the adjusting block 2. Two identical brackets 1, adjusting blocks 2 and cheek plates 3 are symmetrically installed on two sides of a pair of nip rollers 5. The adjusting block 2 has a step portion. One end of the step portion is a cylindrical piston with a smaller diameter, which can slide inside and along the axis of the cylinder in the bracket and the other end of the step portion is a wedge with a bigger diameter than the cylindrical piston. The cylindrical piston and the wedge can be fabricated as one piece or as separate pieces and assembled together. The surface of the wedge consists of a plural of surfaces, which can be curved or a combination of curved and flat surfaces, and preferably, it is a combination curved and flat surfaces. In this example, one side of the wedge is a flat surface and the other side is a portion of a cylindrical surface. The flat surface contacts the cheek plate 3 while the cylindrical surface is in touch with the bracket 1. There is a stop device on bracket 1 at a position corresponding to the position of the step portion of the adjusting block 2. The adjusting block can slide relative to the bracket 1 and it stops moving when the step portion reaches the stop device. When the step portion moves away from the stop device, the wedge of the adjusting block pushes the cheek plate to move towards the sides of the pair of nip rollers 5. The bracket 1 has a cylinder which pairs with the cylindrical piston of the adjusting block 2 and a fluid inlet. In operation, a pressurized fluid is fed into the inlet to drive the adjusting block 2 to move relative to the bracket 1, and the wedge of adjusting block 2 pushes the cheek plate 3 to move towards the pair of nip rollers to achieve full contact between the cheek plate 3 and the sides of the pair of nip rollers and maintains a preset clamping force, which prevents materials from being squeezed out at the edge of the nip rollers and, at the same time, minimizes friction between the cheek plate and the pair of nip rollers. The pressurized fluid is fed into the cylinder via pipeline 6, on which a pressure gauge 7 and a pressure reducing valve 8 are installed. Pipeline 6, pressure gauge 7 and pressure reducing valve are of the ordinary types. The pressure of the fluid can be adjusted in the range of 0.01-1.0 Mpa. The two symmetrical cylinders in bracket 1 are connected to the same fluid pipeline and receive equal pressure. The whole cheek plate adjusting device is screwed on base frame 4. The fluid may be liquid or gas and, preferably, it is gas in this example. The pressure of the gas drives the adjusting block.

Example 2

Figure 5:
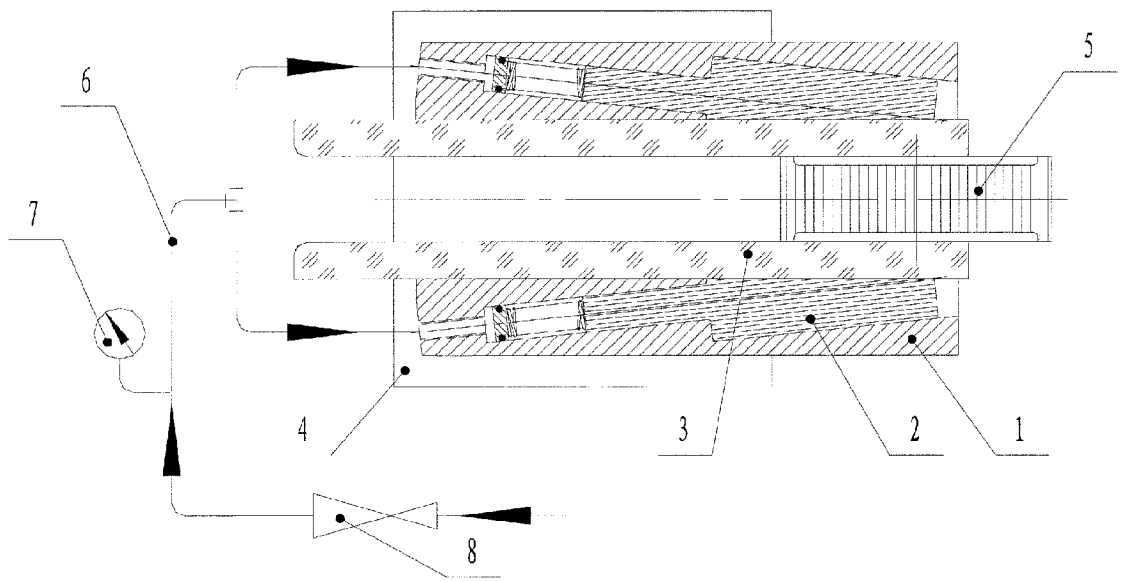

As illustrated in FIG. 5, a cheek plate adjusting device for a crimper includes bracket 1, adjusting block 2 which is installed on bracket 1 and can slide relative to the bracket, and the cheek plate 3 which is installed inside the adjusting block 2. Two identical brackets 1, adjusting blocks 2 and cheek plates 3 are symmetrically installed on two sides of a pair of nip rollers 5. The adjusting block 2 has a step portion. One end of the step portion is a first cylindrical piston with a smaller diameter, which can slide inside and along the axis of the cylinder in the bracket and the other end of the step portion is a wedge with a bigger diameter than the first cylindrical piston. The first cylindrical piston and the wedge can be fabricated as one piece or as separate pieces and assembled together. The surface of the wedge consists of a plural of surfaces, which can be curved or a combination of curved and flat surfaces, and preferably, it is a combination curved and flat surfaces. In this example, one side of the wedge is a flat surface and the other side is a portion of a cylindrical surface. The flat surface contacts the cheek plate 3 while the cylindrical surface contacts the bracket 1. There is a stop device in bracket 1 at a position corresponding to the position of the step portion of the adjusting block 2. The adjusting block can slide relative to the bracket 1 and it stops moving when the step portion reaches the stop device. When the step portion moves away from the stop device, the wedge of the adjusting block pushes the cheek plate to move towards the sides of the pair of nip rollers 5. The bracket 1 has a cylinder, which is designed to pair with the cylindrical piston of the adjusting block 2, and a fluid inlet. A second cylindrical piston is placed in the cylinder and a compression spring is placed between the first and the second cylindrical pistons. One end of the compression spring is in contact with the first cylindrical piston while the other end of the compression spring is in contact with one end of the second cylindrical piston, and the other end of the second cylindrical piston is in contact with the fluid inlet end of the bracket. Optionally, the cylinder can be vented to the atmosphere at a position where the compression spring is housed.

In operation, a pressurized fluid is fed into the inlet to drive the second cylindrical piston to move, the second cylindrical piston drives the compression spring to move, and the compression spring drives the adjusting block 2 to slide relative to the bracket 1. The wedge of the adjusting block 2 pushes the cheek plate 3 to move towards the pair of nip rollers to achieve full contact between the cheek plate 3 and the sides of the pair of nip rollers and maintains a preset clamping force, which prevents materials from squeezed out at the edge of the nip rollers and, at the same time, minimizes friction between the cheek plate and the pair of nip rollers. The pressurized fluid is fed into the cylinder via pipeline 6, on which a pressure gauge 7 and a pressure reducing valve 8 are installed. Pipeline 6, pressure gauge 7 and pressure reducing valve are of the ordinary types. The pressure of the fluid can be adjusted in the range of 0.01-1.0 Mpa. The two symmetrical cylinders in bracket 1 are connected to the same fluid pipeline and receive equal pressure. The whole cheek plate adjusting device is screwed on base frame 4. The fluid may be liquid or gas and, preferably, it is a liquid.

In the present invention, the clamping force between the cheek plate 3 and the sides of the pair of nip rollers is precisely adjusted by adjusting the pressure of the fluid, and the clamping force is maintained at the preset value.

The above description of the examples is to help technicians with ordinary skill in this field to understand and apply the invention. Modification of the examples and application of the principle of the invention in other examples will is obvious to those skilled in this field. Therefore, the invention should not be limited by these examples. Any modification and improvement based on the disclosure of the invention should be in the scope of the claims.

We claim:

1. A cheek plate device for a stuffer box crimper, comprising brackets, adjusting mechanisms, cheek plates, a base frame and a pair of nip rollers, wherein the adjusting mechanisms are mounted on the brackets, which can slide relative to the bracket, the cheek plates are mounted on the inside of the adjusting mechanisms, and two identical brackets, adjusting mechanisms and cheek plates are mounted symmetrically at two sides of the pair of nip rollers and affixed on the base frame, and further comprising fluid thrust devices that include cylinders and fluid inlets located on the brackets, wherein one end of the adjusting mechanism is inserted into and coupled with the cylinder and the fluid thrust devices are connected to the fluid inlets, through which a fluid flows into the cylinders and pushes the adjusting mechanisms to move and press against the cheek plates.

2. A cheek plate device of claim 1, wherein the fluid thrust device includes a tubing system which is connected to the cylinder through the inlet in the bracket, a pressure gauge and a pressure reducing valve, which are installed in the tubing system.

3. A cheek plate device of claim 2, wherein fluid used in the fluid thrust device is liquid or gas.

4. A cheek plate device of claim 1, wherein the adjusting mechanism comprises an adjusting block with a step portion, of which, one end is a piston that is smaller in diameter than the other end of the step portion and is inserted into the cylinder and can slide back and forth along the axis of the cylinder, and the other end is a wedge, of which, one side being in contact with the cheek plate and the other side being in contact with the bracket, and a stop device which is located in the bracket corresponding to the position of the step portion of the adjusting block, wherein fluid of the thrust device flows into the cylinder through the inlet to drive the piston, the piston pushes the wedge, and the wedge pushes the cheek plate to move towards the sides of the nip rollers.

5. A cheek plate device of claim 4, wherein the piston and the wedge of the adjusting block are fabricated as one piece or as separate pieces that are assembled together to form the adjusting block; and the surface of the wedge consists of a plural of surfaces, which can be curved, flat or a combination thereof.

6. A cheek plate device of claim 4, wherein the cross section of the piston of the adjusting block is a regular geometric shape.

7. A cheek plate device of claim 1, wherein the adjusting mechanism comprises an adjusting block, a compression spring and a second piston, which adjusting block has a step portion, of which, one end is a first piston that is smaller in diameter than the other end of the step portion and is inserted into the cylinder and can slide back and forth along the axis of the cylinder, and the other end is a wedge, of which, one side is in contact with the cheek plate and the other side with the bracket, and a stop device, which is placed in the bracket corresponding to the position of the step portion of the adjusting block, wherein the first piston is in contact with one end of the compression spring in the cylinder, the other end of the compression spring is in contact with one end of the second piston, the other end of the second piston is in contact with the inlet end of the bracket, and the fluid from the thrust device flows into the cylinder through the inlet to drive the second piston, which presses the compression spring, which, via the first piston, moves the wedge, which pushes the cheek plate to move towards the sides of the nip rollers.

8. A cheek plate device of claim 7, wherein the first piston and the wedge of the adjusting block are fabricated as one piece, or as separate pieces and assembled together to form the adjusting block, and the surface of the wedge consists of a plural of surfaces, which can be curved, flat or a combination thereof.

9. A cheek plate device of claim 7, wherein the cross section of the first piston of the adjusting block is a regular geometric shape.

10. A cheek plate device of claim 7, wherein the cylinder is vented to the atmosphere at a location where the compression spring is housed.

* * * * *